(12) United States Patent
Bandemer et al.

(10) Patent No.: US 6,483,958 B2
(45) Date of Patent: Nov. 19, 2002

(54) PMD COMPENSATOR

(75) Inventors: Adalbert Bandemer, Dachau (DE); Egbert Krause, Burgstadt (DE)

(73) Assignee: Tektronix Munich, GmbH (DE)

( * ) Notice: Subject to any disclaimer, the term of this patent is extended or adjusted under 35 U.S.C. 154(b) by 0 days.

(21) Appl. No.: 09/849,081

(22) Filed: May 4, 2001

(65) Prior Publication Data

US 2002/0021854 A1 Feb. 21, 2002

(30) Foreign Application Priority Data

| May 6, 2000 | (DE) | 100 21 835 |
| May 6, 2000 | (DE) | 100 21 836 |
| Jul. 12, 2000 | (DE) | 100 33 821 |
| Jul. 17, 2000 | (DE) | 100 35 083 |

(51) Int. Cl.$^7$ ............................... G02B 6/27
(52) U.S. Cl. ......................... 385/11; 359/156
(58) Field of Search ............... 385/11, 24, 15, 385/27; 359/140, 156, 153, 161

(56) References Cited

U.S. PATENT DOCUMENTS 5,930,414 A * 7/1999 Fishman et al. ............ 359/140
6,144,450 A * 11/2000 Jopson et al. ................ 250/225
6,342,945 B1 * 1/2002 Allen et al. ................. 356/73.1

* cited by examiner

*Primary Examiner*—John D. Lee
*Assistant Examiner*—Scott A Knauss
(74) *Attorney, Agent, or Firm*—St. Onge Steward Johnston & Reens LLC

(57) ABSTRACT

The invention describes a system to compensate distortions caused by polarization modulation dispersion (PMD) in optical transmission systems and particularly transmission fibers, with a measuring device for distortions caused by PMD, an emulation unit for adjustable PMD values, a polarization transformation element, which adjusts the polarization of the signals coming from a transmission system to the PMD emulation unit, an analyzer and control unit, connected to the output signal of the measuring device, which unit controls the emulation unit and the polarization adjuster element. The invention is distinguished in that the emulation unit has a PMD emulator, which emulates PMD of second or higher order and matches PMD of a real transmission fiber as exactly as possible, and that the one or more PMD emulators compensate one or more transmission channels, and/or that the measuring device optically detects the PMD directly or by way of the detection of polarization conditions.

29 Claims, 3 Drawing Sheets

PMD COMPENSATOR

CROSS-REFERENCE TO RELATED APPLICATIONS

This application claims priority of German patent applications DE10021835.0 and DE10021836.9 filed on May 6, 2000, DE10033821.6 filed on Jul. 12, 2000 and DE10035083.6 filed on Jul. 17, 2000.

FIELD OF THE INVENTION

The invention concerns a system to compensate for distortions caused by PMD in optical transmission systems and particularly transmission fibers.

Because every glass fiber is unintentionally double-refractive to some degree, light signals of various polarization run through glass fiber at diverse collective speeds. Therefore, light particles of diverse polarization reach the receiver at different times with respect to one another; this running time effect results in a spreading of the received signal and thus a reduction of transmission quality. In particular, this can lead to a rise in bit error rates.

Polarization mode dispersion includes all polarization-dependent running time effects, in which the signal spreading can be fully described by the spreading behavior of two mutually independent, orthogonally related polarization modes. Because double refraction is constantly changing through external influences such as temperature and mechanical load, and in addition depends on the wave length, there is permanent variation both in the position of the principal states of polarization (PSP) and in the running time difference between the PSPs. This is referred to also as second-order polarization mode dispersion.

The result of the aforementioned effects is a time-fluctuating wavelength-dependent PMD behavior with time constants on the order of minutes.

Distortions in transmission systems caused by polarization mode dispersion (PMD) must be compensated for high-speed data transmissions in order to maintain signal quality.

BACKGROUND OF THE INVENTION

A system whereby such PMD-induced distortions can be compensated, must include a measuring device for the PMD-induced distortions. In addition there must be (at least) one emulation unit for adjustable PMD values and (at least) one adaptor element or polarization transformation element, to adjust PSPs of the signals from a transmission system to PSPs of the PMD emulation unit. The emulation unit and the polarization transformation element are driven by an analyzer and control unit that is connected to the output signal of the measuring device.

Although systems of this kind have often been proposed in the literature and especially in patent documents, so far no systems have been commercially available which would satisfy the practical demands on such a system.

The reason for this, on the one hand, is that in the past no measuring device for PMD-induced distortions has been available that was sufficiently rapid and simple enough in design. The exact design of the measuring device is the subject of a parallel application. A second reason for this situation is that there has been no emulation unit that can match the PMD of a real transmission fiber and particularly of a D-WDM fiber with the greatest possible exactitude. A special emulation unit, which can also be implemented with the present invention, is the subject of another parallel application.

SUMMARY OF THE INVENTION

The invention fulfills the requirement to provide a system for compensating PMD-induced distortions in optical transmission systems and particularly transmission fibers, which system will allow compensation of PMD-induced distortions in a manner that is rapid and adequate for practical use.

Solutions of this requirement by means of the invention are provided in the independent Patent Claims. Refinements of these solutions can be found in the related Claims.

Both the emulation unit and the measuring device for the PMD-induced distortions (singly or in combination) can be further developed in the context of the invention.

In one solution of the invention, which concerns the emulation unit, said unit includes a PMD-emulator, which also emulates second-order PMD and matches the PMD of a real transmission fiber with the greatest possible exactitude.

Such an emulation unit is described in the parallel patent application by the same applicant and indicates a system for compensating first-order dispersion. After running through this system, the light enters an element which twists the polarization principal axes before and behind the element by a particular angle to one another. The light signal emerging from this element is fed into a device consisting of a polarization splitter/combiner element, a delaying path, and another polarization splitter/combiner element for reuniting the two signal tracks. Thanks to this device, in addition to producing a first-order polarization mode dispersion, it is also possible to produce a second-order dispersion. It is especially advantageous that—on the basis of a system for compensating first-order dispersion—it is not even necessary to use additional components that would increase costs. Instead it is possible to produce, in line with this invention, a second-order polarization mode dispersion from the fact that the unused input connection of the second polarization splitter/combiner element serves as an input connection for the signal. This signal then runs through the delaying path and the first polarization splitter/combiner element in the opposite direction to the oncoming signal. At the fourth gate of the first polarization splitter/combiner element, this signal is then uncoupled. The uncoupled signal then shows the desired first- and second-order polarization mode dispersion.

A particular advantage, however, is the use of an emulation unit for adjustable PMD values, which has at least one delaying line, which is contacted by the input signal for at least one polarization control element unit. In particular, the emulation unit can preferably include several polarization adjustment element units. It is also preferable to stagger the delay periods between successive polarization adjustment element units to approach binary intervals.

With the PMD emulator of this invention, the PMD-induced distortions of one or more transmission channels can be compensated.

In another solution of the objective addressed by this invention, to create a measurement device for PMD-induced distortions, the device is designed so that it optically detects the PMD directly or by way of the detection of polarization conditions in one or more transmission channels of the transmission system. On the basis of this design, it is possible in particular that the output signal of the measuring device serves as an actual signal for the control of the emulation unit or, with multi-channel detection, for the control of several emulation units and of the superposed polarization transformation elements.

Here it is particularly advantageous if the measuring device, in addition to the optical registration, has at least one optoelectric transformer and at least one filter, which filters the output signal of the transformer, and that the filter's output signal as another actual signal is connected to the analyzer and control unit or to a drive unit that is independent of the analyzer and control unit for one or more polarization transformation elements.

In every case, however, the control values for the polarization transformation elements, as defined on the basis of the measurement, are adjusted or regulated so that a control according to the trial-and-error principle, as used in the current technological status, can be omitted.

Here it is also most advantageous, again in the sense of an independent solution, if the one or more polarization transformation elements have as many as three or more polarization control elements or polarization-affecting elements, which guide the control and analyzer unit or the drive unit on the basis of the output signal of the measuring device. In particular, every polarization control element unit can have at least one polarization-affecting element, which exerts a mechanical effect on the fibers or otherwise influences the polarization.

The influence on polarization can, for instance, occur through elements such as liquid crystal polarization rotaters, yig crystals, or nematic components, although the aforementioned list is incomplete. In the context of this invention—and also in the sense of an independent solution—it is, however, particularly advantageous if elements are used that exert a mechanical effect. These elements can, in particular, be fiber squeezers or stretchers with electrically controllable elements such as piezo elements, which exert a mechanical effect on the fibers.

In the use of elements which exert a mechanical effect, it is particularly advantageous, to ensure distribution of the mechanical effect onto the greatest possible fiber length, if these elements have a ring around which the fiber is wound without any twisting. This makes it possible, thanks to the long effective fiber path, to work with comparatively small bridges. Thus fibers with a standard coating can be used, without the lifetime of the fibers being reduced in practice. It is necessary, on the other hand, at the current technological state of the art, to use a particularly hard coating so that the lifetime is at least not reduced excessively.

In another advantageous version, at least one pressure-exerting element is foreseen, which at one place at least exerts pressure on a number of fiber particles of the rolled-up fibers. This pressure-exerting element can, in particular, be an elongating element like a piezo element, which contacts at least one circle segment of the rolled-up fibers and is connected to the ring. Corresponding to the circle segments, opposing segments are foreseen, which are connected to the fiber particles and exert pressure on the fibers. This design has the advantage that an exertion of pressure on the fibers occurs without "stretching" the fibers. In this version it is an advantage if it occurs in such a way that no thermal influences arise.

As already explained, another advantageous version foresees that every polarization control element has at least two polarization-affecting elements that influence the fibers in various directions, and that these directions are preferably (approximately) zero and 45 degrees.

These diverse directions can be produced in various ways:

It is possible, for instance, to provide elements between the polarization-affecting polarization-rotating elements, or to splice in polarization-rotating fibers. It is however particularly advantageous—since it is simple and thus economical—if the various directions are produced by rotating or "twisting" the fiber particles between two successive polarization-affecting elements.

It is theoretically possible that the measuring device for PMD-induced distortions is a polarimeter that is known in its own right. The measuring device used with this invention for PMD-induced distortions can, however, be constructed in a particular manner so that the input light signal and the signal of an optical element that is variable in its wavelength, for instance a filter or in particular a laser, are optically superposed and the polarization conditions necessary for measuring the PMD-induced distortion are produced as firm or adjustable figures.

In the event that only one transmission channel is detected, it is possible to use only an element that is only penetrable on a narrow bandwidth, for instance over plus-or-minus 0.5 nm, and in particular a laser. The laser in particular can be a temperature-powered and/or electrically powered DFB or VCSEL laser. If the PMD-induced distortions of several transmission channels are to be detected with the measuring device, then elements penetrable on a broadband, such as DBR or fiber lasers, can be used.

To produce measurement values in three, four, or more defined polarization conditions in particular, the polarization transformation elements can be arranged either in the branch of the input signals or else in the branch of the variable element.

The elements can be produced successively in time, for instance, producing polarization conditions of 0, 45, and 90 degrees and "circularly polarized."

The polarization conditions necessary for measuring PMD-induced distortions can also be produced simultaneously through a firm division of the input signals or of the variable signal through an appropriate system. Such a system can for instance have polarization beam dividers or instead of four polarization beam dividers an arrangement of four prisms, assembled in the manner of a polarization beam divider in order to reduce adjustment effort. If four prisms are attached to a cube, balance receivers can be used as receivers, with the signal split into the various polarization segments and the detection suppressed with one or more balance receiver disturbances, which are present without a use signal.

In addition it is preferable if the analyzer and control unit regulates the PMD compensation in such a way that the polarization condition of the optical data signal is held (almost) constant over the wavelength.

As already stated, the analyzer and control unit can drive the one or more polarization transformation elements. Alternatively, and especially because of the speed of regulation, it is preferable, however, if a drive unit independent of the analyzer and control unit is provided for the one or more polarization transformation elements. This drive unit can in particular be an analog switching device, which is more rapid than a digital signal processor (DSP) or a microcontroller.

Regardless of the type of drive, it is especially preferable if the polarization transformation element, which adjusts the polarization of the signals from a transmission system to the PMD emulation unit, is driven in modulated fashion, and it is most advantageous if the two or more polarization-affecting elements are modulated with diverse frequency. To do so it is possible that the output signal of the emulation unit is connected to the drive unit, and that the drive unit has electrical and/or optical filters with acceptance characteristics adjusted to the modulation frequencies.

To be able to regulate very quickly, it is of particular advantage that, to receive each time the weight and phase information and thus the regulating direction and regulating amplitude, the output signal of the drive unit is mixed each time with one of the modulation frequencies, and that the mixed signals serve to drive one polarization-affecting element in each case.

Through the use of reset algorithms in setting control values, it is possible to conduct endless transformations, not only with polarization elements in line with the invention, but also with conventional ones.

The system of this invention in any case has the additional advantage that the PMD compensation is independent of the bit rate of the optic data signal, that the measuring method is flexible so that no firm filter must be used, and that the measuring is not influenced by other dispersion effects, such as for instance chromatic dispersion.

BRIEF DESCRIPTION OF THE DRAWINGS

The invention is described in more detail below by means of examples referring to the drawing. The illustrations are as follows.

DETAILED DESCRIPTION OF THE DRAWINGS

Figure 1:
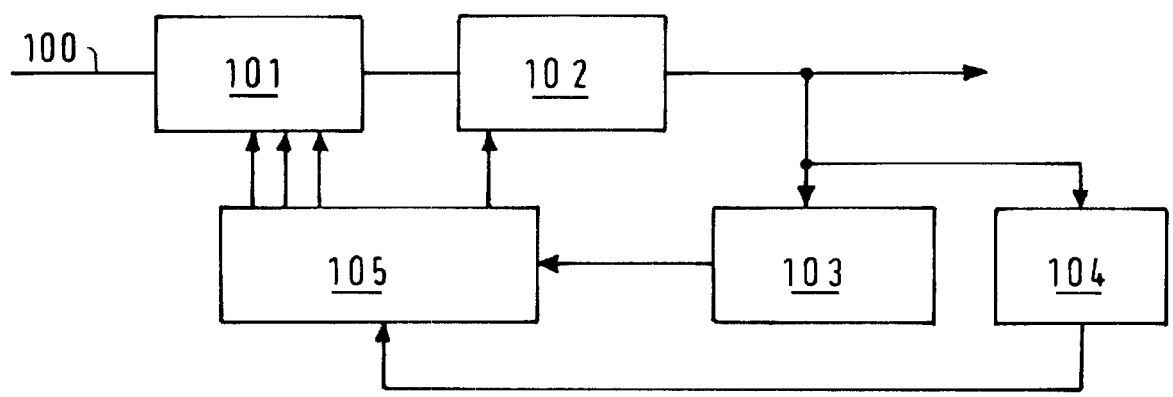
FIG. 1 A system for compensating distortions caused by polarization modulation dispersion (PMD) in optical transmission systems and particularly in transmission fibers.

FIG. 1 shows a system for compensating distortions caused by polarization modulation dispersion (PMD) in optical transmission systems and particularly in transmission fibers. A fiber (100) is connected to the input connection of a polarization transformation element (101). The output connection of the polarization transformation element (101) is connected to the input connection of an emulation unit (102) for adjustable PMD values, which is described in more detail below. At the output connection of the emulation unit (102) a measuring device (103) for PMD-induced distortions is affixed, which device registers the polarization conditions and/or the PMD-induced distortion by means of optical superposition of the input light signal and of the signal of an optical element that is variable in wavelength, and particularly of a laser. The variable optical element can be a narrow-band variable laser, whose variable area is at least large enough so that it allows the measuring of the PMD-induced distortions of an optical transmission channel. In addition, the transmissible optical element can be a broadband transmissible laser, whose transmissible areas is large enough to allow the measuring of PMD-induced distortions of several optical transmission channels. The exact design of the measuring device is the subject of a parallel patent application.

In addition, it is advantageous for an optoelectrical transformer with a filter (together designated as 104) to be installed, which filters the output signal of the transformer. The output signal of the measuring device (103) and of the element (104) are connected as actual signals to an analyzer and control unit (105), which guides the polarization transformation element (101) and the emulation unit (102).

In terms of the invention, the emulation unit (102) has at least one PMD emulator, which emulates the second-order and higher PMD and thus matches the PMD of a real transmission fiber as exactly as possible, and which compensates at least one or more transmission channels.

Figure 2:
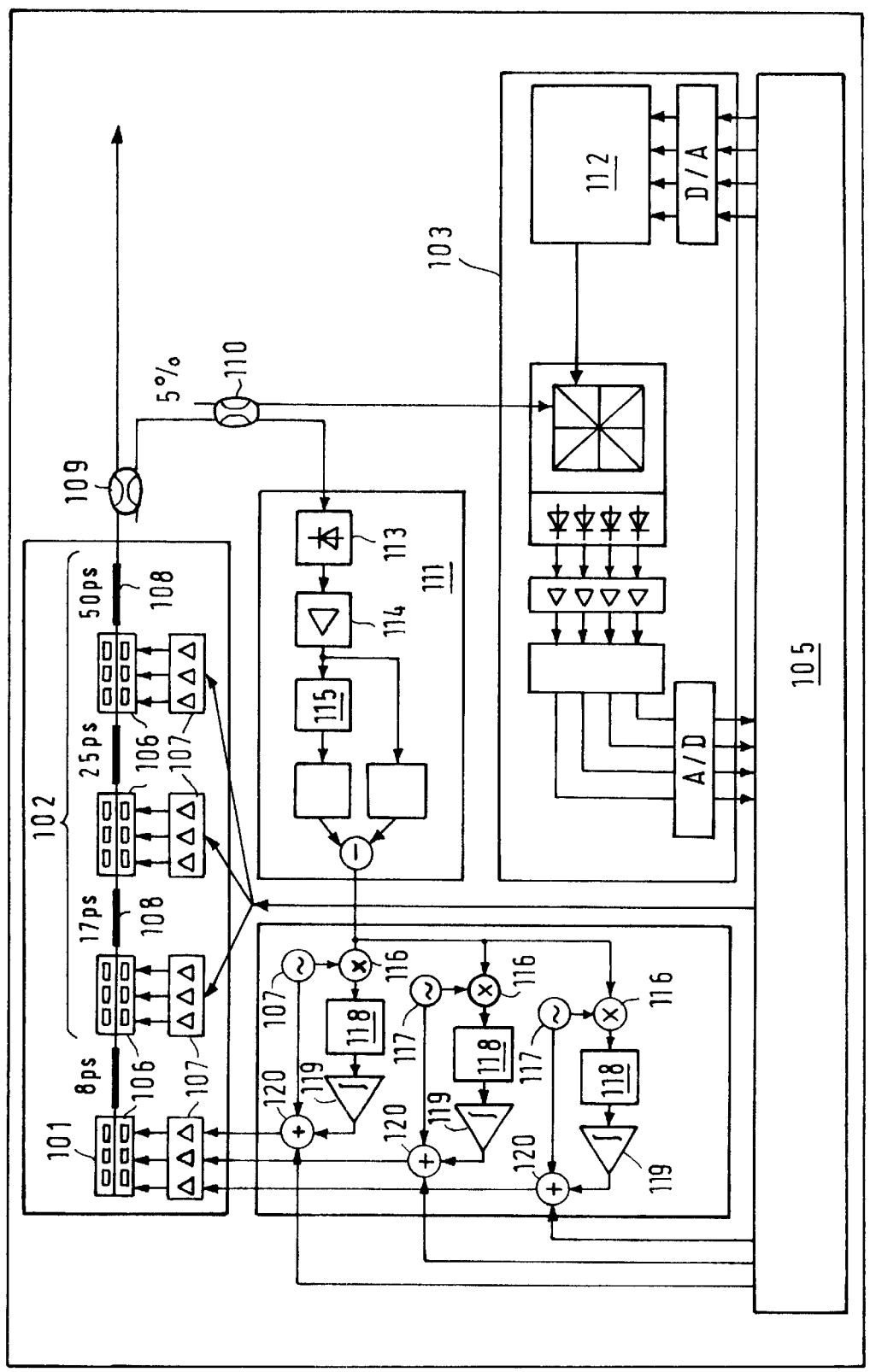
FIG. 2 An emulation unit, according to the invention, for higher-order PMD with drive.

FIG. 2 illustrates an example for this kind of emulation unit (102) as well as a polarization transformation element (101).

In the example illustrated in FIG. 2, the polarization transformation element (102) includes a polarization control element unit (106) and the emulation unit (102) has three polarization control element units (106), which in each case can be driven by control units (107). Between the units (106) there are delaying lines (108) with progressively increasing, and in particular binary-staggered, delay time (for example 8 ps, 17 ps, 25 ps, and 50 ps).

Every polarization adjustor element unit (106) in the illustrated example has three fiber squeezers with for instance piezo elements, whose "effective directions" are 0, 45, and 0 degrees. These fiber squeezers can in particular be elements, as they are to be described in relation to FIG. 2.

At the output connection of the emulation unit (102) an initial fiber coupler (109) is arranged, which for example "diverts" five percent of the emerging light "into a second fiber coupler" (110). The second fiber coupler (110) divides the light in appropriate manner so that one part of the light enters the measuring device (103) for the analyzer and control unit (105) for the emulation unit (102), which adjusts the control values for the polarization transformation element as defined on the basis of the measurement, and another part of the light enters a drive unit (111) that is independent of the analyzer and control unit (105) for the polarization transformation element (101).

The analyzer and control unit (105), in already known manner, has a microcontroller or a digital signal processor.

The measuring device (103) detects the polarization conditions and/or the PMD-induced distortion by means of optical superposition of the input light signal and of the signal of an optical element of variable wavelength. In the illustrated example, the measuring device (103) has a variable laser (112), whose variable area is at least large enough so that it allows the measuring of the PMD-induced distortions of at least one optical transmission channel, as well as elements for producing the polarization conditions necessary for the PMD measuring values and appropriate receiver elements, whose output signals after an analog/digital conversion are connected to the analyzer and control unit (105). The elements include in particular beam dividers, optoelectronic receivers, diodes, amplifiers, and so on, as well as analog/digital transformers.

The drive unit (111) has an optoelectronic receiver (113), an amplifier (114), a band pass (115), as well as other elements that connect a filtered electric signal to mixed elements. Connected to the mixed elements (116), in addition, is the signal of one sinus generator (117) each time. The frequencies of the individual sinus generators (117) vary, so that they could be for instance 50 kHz, 55 kHz, and 60 kHz. The mixed signals are each linked by way of a low pass (118) and an integrating amplifier (119) to an accumulator, to which the signal of the respective sinus generators (117) as well as control or reset signals of the analyzer and control units (105) are also connected. The output signal of the accumulators (120) each controls one control unit (107) for one polarization-affecting element of the unit (106) of the polarization transformation element (101).

The configuration shown in FIG. 2 has the advantage that very quickly, through the modulation, the load and phase information and thus data on the regulator direction and regulator amplitude [no grammatical connection here in German] the output signal of the drive unit is received, so that the regulation is extremely rapid.

Figure 3:
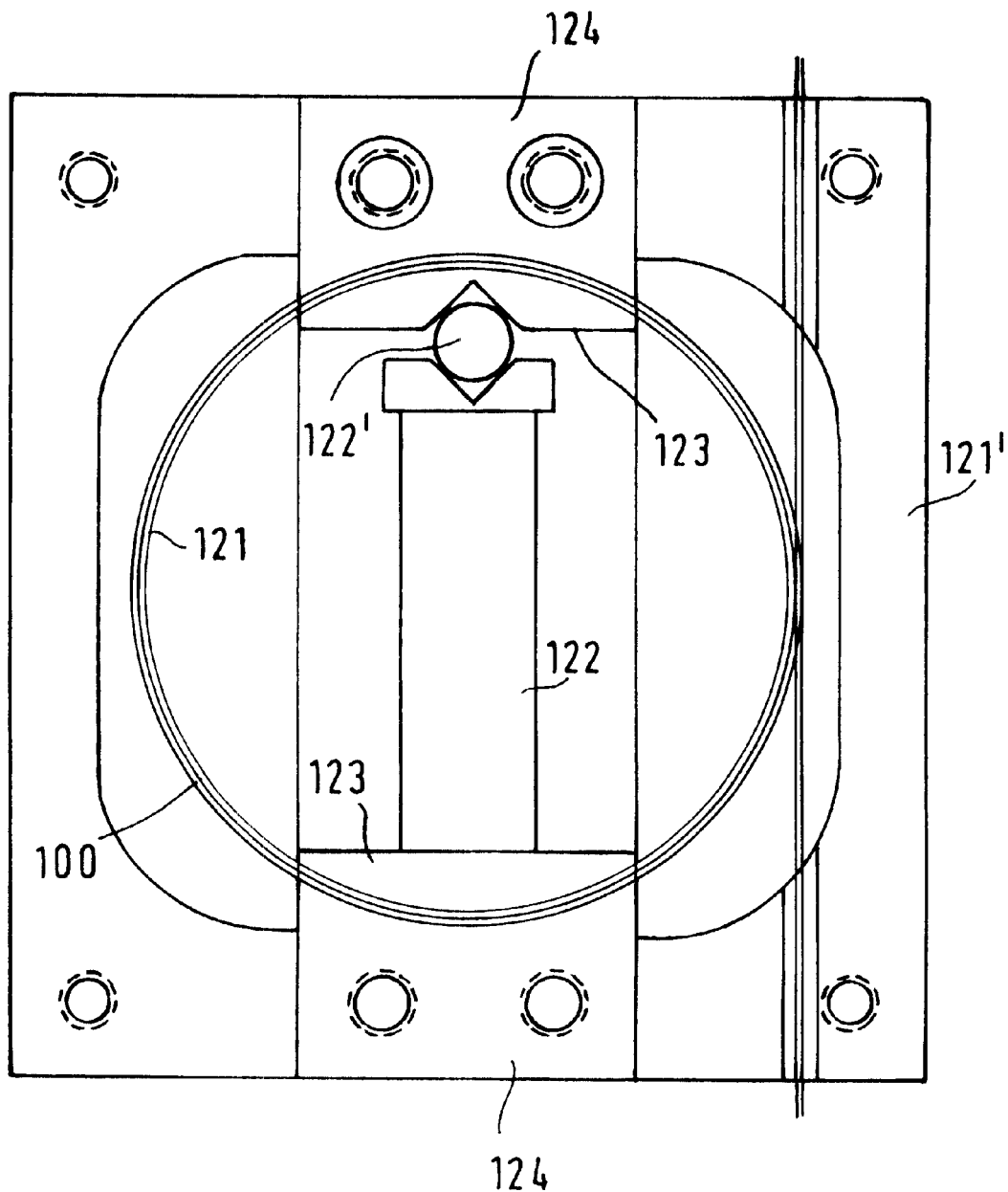
FIG. 3 An element that influences polarization, in keeping with the invention.

FIG. 3 shows a preferred model for an element that exerts a mechanical effect on the fibers (100) for the purposes of influencing polarization. To distribute the mechanical effect over the greatest possible fiber length, a ring (121) is set in a housing (121'), on which ring the fiber (100) is wound without twisting. The illustration does not show the insertion of the fiber in the ring and the exiting of the fiber from the ring or the housing. The ring (121) consists, for instance, of a thin, malleable precious metal part. In the ring (121) a pressure-exerting element (122) is installed, for example a piezo element, which is supported—on one side by way of a compensating element (122')—on two circle segments (123), which in turn are connected to the ring. Opposite the circle segments (123), opposing segments are installed, which are supported on the housing (121') and are connected to the fiber particles, so that, upon a corresponding elongation of the element (122), they exert pressure on the fiber (100). Through an elongation of the piezo element (122), thus, the fiber (100) can be mechanically pressured as desired.

What is claimed is:

1. System to compensate distortions caused by polarization modulation dispersion (PMD) in optical transmission systems and particularly transmission fibers, with:
   a measuring device for distortions caused by PMD,
   an emulation unit for adjustable PMD values,
   at least one polarization transformation element, which adjusts the polarization of the signals coming from a transmission system to the PMD emulation unit,
   an analyzer and control unit, connected to the output signal of the measuring device, which unit controls the emulation unit,
   distinguished in that the measuring device, either directly or by way of the detection of polarization conditions of at least one transmission channel, detects the PMD optically through interference of the signal of the transmission channel with the narrow-band signal of a light source.

2. System according to claim 1, distinguished in that the measuring device includes an optoelecrical transformer and at least one filter, which filters the transformer's output signal, and that the output signal of the filter is connected to the analyzer and control unit as an additional actual signal.

3. System according to claim 1, distinguished in that the emulation unit has a PMD emulator, which emulates PMD of second and possibly higher order and matches PMD of a real transmission fiber as exactly as possible, and that the one or more PMD emulators compensate at least one transmission channel.

4. System according to claim 1, distinguished in that the emulation unit and/or the minimum of one polarization transformation element have at least one delaying line, which is engaged with the input signal by way of at least one polarization adjuster element unit.

5. System according to claim 4, distinguished in that there is more than one delaying line and that the delay periods of the individual line are staggered approximately in binary intervals.

6. System according to claim 4, distinguished in that every polarization adjuster element unit has at least one polarization-affecting element, which exerts a mechanical effect on the fibers or otherwise affects the polarization.

7. System according to claim 6, distinguished in that the elements, which otherwise affect the polarization, are liquid crystal polarization rotators, yig crystals, or nematic component parts.

8. System according to claim 6, distinguished in that the elements which exert a mechanical effect, are fiber squeezers or stretchers with electrically controllable elements such as piezo elements, which exert a mechanical effect on the fibers.

9. System according to claim 8, distinguished in that at least one of the elements which exert a mechanical effect, in order to distribute the mechanical effect on the greatest possible fiber length, has a ring on which the fibers are wound without any twisting.

10. System according to claim 9, distinguished in that at least one pressure-exerting element exerts pressure in at least one spot on a number of fiber fragments of the wound-up fibers.

11. System according to claim 10, distinguished in that the pressure-exerting element is an elongating element which contacts at least one circle segment which is connected to the ring, and that at least for part of the circle segments, contrary segments are provided, which are connected to the fiber fragments and exert pressure on the fibers.

12. System according to claim 6, distinguished in that every polarization adjuster element has at least two polarization-affecting elements, which influence the fibers in different directions.

13. System according to claim 12, distinguished in that the directions describe angles of zero and 45 degrees.

14. System according to claim 12, distinguished in that the different directions are produced by turning or "twisting" the fiber fragments between two successive polarization-affecting elements.

15. System according to claim 1, distinguished in that the measuring device for PMD-induced distortions is a polarimeter that is known in itself.

16. System according to claim 1, distinguished in that the measuring device registers the polarization conditions and/or the PMD-induced distortion optically by means of optical interference of the input light signal and of the signal of an optical element that is variable in its wavelength, and particularly of a laser.

17. System according to claim 16, distinguished in that the variable optical element is a narrow-band variable laser, whose variable area is at least large enough so that it allows the measurement of the PMD-induced distortions of an optical transmission channel.

18. System according to claim 16, distinguished in that the variable optical element is a broad-band variable laser, whose variable area is large enough that it allows the measurement of the PMD-induced distortions of several optical transmission channels.

19. System according to claim 16, distinguished in that the elements for producing the polarization conditions necessary for the PMD measurement values are arranged either in the light path of the input light signal or in the light path of the variable optical element.

20. System according to claim 16, distinguished in that the necessary polarization conditions are produced successively through altered polarization adjustment elements and/or by means of an optical structure made up of beam dividers or from prisms as well as wave plates for a polarization diversity reception.

21. System according to claim 1, distinguished in that the analyzer and control unit regulates the PMD compensation in such a way that the polarization condition of the optical data signal is constant over the entire wavelength.

22. System according to claim 1, distinguished in that the analyzer and control unit drives the one or more polarization transformation elements.

23. System according to claim 22, distinguished in that the analyzer and control unit detects the adjustment values for the polarization transformation element in definite terms on the basis of the measurement.

24. System according to claim 1, distinguished in that a drive unit, independent of the analyzer and control unit, is provided for the one or more polarization transformation elements.

25. System according to claim 1, distinguished in that the polarization transformation element, which adjusts the polarization of the signals arising from a transmission system to the PMD emulation unit, is driven on a modulated basis.

26. System according to claim 25, distinguished in that the minimum of two polarization-affecting elements are modulated with varying frequency.

27. System according to claim 26, distinguished in that the output signal of the emulation unit is connected to the drive unit, and that the drive unit has electrical and/or optical filters with a flow-through characteristic adjusted to the modulation frequencies.

28. System according to claim 26, distinguished in that, for the reception of the load and phase information and thus of the control direction and control amplitude, the output signal of the drive unit is mixed with one of the modulation frequencies each time, and that the mixed signals each serve to drive one polarization-affecting element.

29. System according to claim 1, distinguished in that the analyzer and control unit by means of reset algorithms carries out an endless polarization transformation through modification of the nominal values for the individual adjustment elements of the polarization transformation element.

* * * * *